2,944,061

CERTAIN NITRO IMIDAZOLEALKANOLS AND ACYL DERIVATIVES AND PROCESS

Robert Michel Jacob, Ablon-sur-Seine, Gilbert Louis Regnier, Paris, and Cornel Crisan, Sceaux, France, assignors to Société des Usines Chimiques Rhone-Poulenc, Paris, France, a French body corporate No Drawing. Filed Jan. 8, 1959, Ser. No. 785,577

Claims priority, application France Sept. 20, 1957

8 Claims. (Cl. 260—309)

This invention relates to new imidazole derivatives and processes for their preparation. It is a continuation-in-part of application Serial No. 731,108, filed April 28, 1958, now abandoned.

According to the present invention there are provided new imidazoles conforming to the general formula:

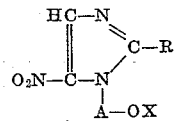

wherein R represents a hydrogen atom or an alkyl group containing up to five carbon atoms (preferably methyl or ethyl), A represents a divalent saturated straight or branched chain aliphatic hydrocarbon group containing two to four carbon atoms and X represents a hydrogen atom or an acyl residue of a monocarboxylic or dicarboxylic aliphatic or aromatic acid, and acid addition salts thereof.

Since large numbers of monocarboxylic and dicarboxylic aliphatic and aromatic acids are known it is impossible to list them exhaustively. The general utility of acids in these classes is however exemplified by the examples which follow wherein the ester groupings are selected over a wide range of such acids, e.g. lower aliphatic monocarboxylic acids such as acetic acid and dichloroacetic acid, higher aliphatic monocarboxylic acids such as pivalic acid and stearic acid, aliphatic dicarboxylic acids such as succinic acid, aromatic monocarboxylic acids such as benzoic acid and its substitution derivatives such as salicylic acid, chlorobenzoic acids, methoxy benzoic acids and nitrobenzoic acids, and aromatic dicarboxylic acids, of which the phthalic acids are the most readily available examples.

According to a feature of the present invention, compounds of the aforesaid general formula in which X is a hydrogen atom, are prepared by reacting in the absence of a basic condensing agent a 4(or 5)-nitroimidazole with a compound of the general formula Z—A—OY wherein Z represents an acid residue of a reactive ester selected from a halogen atom and the acid residues of sulphuric and sulphonic esters, Y represents a hydrogen atom or a radical which is readily replaceable by a hydrogen atom, for example a tetrahydropyranyl or benzyl group, and A is as hereinbefore defined and, where Y is other than a hydrogen atom, liberating the hydroxyl group by known methods, e.g. by acid hydrolysis when Y is tetrahydropyranyl or benzyl.

According to a further feature of the present invention, compounds of the aforesaid general formula in which X is an acyl group, are prepared from the corresponding alcohols (X=H) by known methods of esterification, in particular, by the action of an acid chloride in the presence of pyridine.

By the words "known methods" as used in this specification and accompanying claims is meant methods heretofore employed or described in the chemical literature.

The imidazole derivatives of the aforesaid formula possess valuable chemotherapeutic properties; in particular, they have utility in the treatment of infections due to pathogenic protozoa such as certain species of amoebae (for example *Endamoeba histolytica*) or trichomonas (for example *Trichomonas vaginalis*). They have a very low toxicity.

For therapeutic purposes, the new imidazoles are preferably employed as such or in the form of acid addition salts containing anions which are relatively innocuous to the animal organism in therapeutic doses of the salts (such as hydrochlorides and other hydrohalides, phosphates, nitrates, sulphates, maleates, fumarates, citrates, tartrates, methanesulphonates and ethanedisulphonates) so that the beneficial physiological properties inherent in the bases are not vitiated by side-effects ascribable to the anions.

The following examples illustrate the invention.

Example I 2-methyl-4(or 5)-nitroimidazole (127 g.) is heated with ethylene chlorohydrin (795 g.) for 18 hours at 128–130° C. and the chlorohydrin (660 g.) is then distilled under reduced pressure (30 mm. Hg). The residue is treated with water (300 cc.) and filtered, and the filtrate is made alkaline by the addition of sodium hydroxide solution ($d=1.33$, 100 cc.). It is then extracted with chloroform (1,000 cc.) and, after evaporation of the chloroform in vacuo, there is obtained a pasty mass (77 g.) which is recrystallised from ethyl acetate (450 cc.) in the presence of animal charcoal. There is thus obtained 1-(2-hydroxyethyl)-2-methyl-5-nitroimidazole (24 g.) as a creamy white crystalline powder melting at 158–160° C.

Example II 2-methyl-4(or 5)-nitroimidazole (12.7 g.) and 3-benzyloxypropyl toluene-p-sulphonate (32 g.) (M.P. 33° C.) are heated for 2 hours at 135° C. When the reaction is complete, the reaction mixture is cooled to 25° C. and then agitated with hydrochloric acid (50 cc.). The 3-benzyloxypropyl toluene-p-sulphonate which has not reacted is extracted with ether and the acid liquors are made alkaline with potassium carbonate.

The suspension obtained is filtered to remove unreacted 2-methyl-4(or 5)-nitroimidazole starting material which is washed several times with water and then with chloroform. The filtrate is then decanted and extracted with chloroform. The chloroformic extracts are combined, dried over anhydrous potassium carbonate and then evaporated under reduced pressure. A crude oily product (22 g.) is obtained.

The crude product is dissolved in 15% hydrochloric acid (110 cc.) and debenzylation is effected by heating this solution for 5 hours under reflux. After cooling, the solution is extracted several times with chloroform and the acid liquors are then made alkaline with potassium carbonate. They are then extracted several times with chloroform and the chloroformic solutions are dried over anhydrous potassium carbonate. After evaporation of the solvent under reduced pressure a crude oily base (7 g.) is obtained.

By the addition of ethereal hydrogen chloride to a solution of the base in acetone followed by recrystallisation from a mixture of ethanol and ether of the crystals obtained, there is finally obtained 1-(3-hydroxypropyl)-2-methyl-5-nitroimidazole hydrochloride (4 g.), M.P. 115° C.

*Example III*

2-ethyl-4(or 5)-nitroimidazole (23.8 g.) and benzyloxyethyl toluene-p-sulphonate (51.7 g.) (M.P. 43° C.) are heated for 3 hours at 135° C. After treatment of the reaction products as in Example I a crude oily product (26.2 g.) is obtained which is debenzylated by boiling in 15% hydrochloric acid (130 cc.). On treatment of the hydrochloric acid solution a crude crystalline base (8.2 g.) is obtained which is purified by recrystallisation from a mixture of ethyl acetate and heptane. There is finally isolated 1-(2-hydroxyethyl)-2-ethyl-5-nitroimidazole (7.25 g.), M.P. 87–88° C.

*Example IV*

1-(2-hydroxyethyl)-2-methyl-5-nitroimidazole (8.55 g.) is suspended in anhydrous chloroform (100 cc.). Anhydrous pyridine (4.15 g.) is added and, after cooling to 5° C., dichloroacetyl chloride (7.75 g.) is added dropwise over 20 minutes. When the addition is complete, the temperature is allowed to rise to 15° C. and the mixture is then boiled for 1 hour. The chloroform solution is then cooled and washed several times with water. After evaporation of the solvent the crude ester obtained is purified by successive recrystallisations from a mixture of benzene and heptane and then from di-isopropyl ether.

There is finally obtained 1-(2-dichloroacetoxyethyl)-2-methyl-5-nitroimidazole (7.2 g.), M.P. 86–87° C.

*Example V*

Proceeding as in Example IV but commencing with 1-(2-hydroxyethyl)-2-methyl-5-nitroimidazole (8.55 g.), anhydrous pyridine (4.15 g.) dissolved in chloroform (100 cc.) and acetyl chloride (4.13 g.), a crude ester (8.25 g.) is obtained which is purified by recrystallisation from di-isopropyl ether. There is finally obtained 1-(2-acetoxyethyl)-2-methyl-5-nitroimidazole (6.4 g.), M.P. 74° C.

*Example VI*

Proceeding as in Example IV but commencing with 1-(2-hydroxyethyl)-2-methyl-5-nitroimidazole (6.85 g.), anhydrous pyridine (3.32 g.) dissolved in anhydrous chloroform (80 cc.) and stearoyl chloride (12.7 g.), a crude ester (14.5 g.) is obtained which is purified by successive recrystallisations from petroleum ether. There is finally obtained 1-(2-stearoyloxyethyl)-2-methyl-5-nitroimidazole (6.1 g.), M.P. 51° C.

*Example VII*

Proceeding as in Example IV but commencing with 1-(2-hydroxyethyl)-2-methyl-5-nitroimidazole (8.55 g.), anhydrous pyridine (4.15 g.) dissolved in anhydrous chloroform (100 cc.) and cinnamoyl chloride (8.75 g.), a crude ester (10.9 g.) is obtained, which is purified by successive recrystallisations from a mixture of ethyl acetate and heptane and from di-isopropyl ether. There is finally obtained 1-(2-cinnamoyloxyethyl)-2-methyl-5-nitroimidazole (6.7 g.), M.P. 100° C.

*Example VIII*

1-(2-hydroxyethyl)-2-methyl-5-nitroimidazole (8.55 g.) is suspended in anhydrous chloroform (100 cc.). Anhydrous pyridine (4.15 g.) is added and, after cooling to 5° C., salicyloyl chloride (8.4 g.) is added dropwise over 50 minutes, the temperature being kept below 5° C. After the addition the temperature is kept at 5° C. for 1 hour and the mixture is then agitated at room temperature for 19 hours. Water (60 cc.) is then added to the solution and a white precipitate is formed which is separated and some of the initial 1-(2-hydroxyethyl)-2-methyl-5-nitroimidazole is thus recovered. The filtrate is decanted and the chloroform solutions are washed several times with water and then with a 10% solution of sodium bicarbonate. After drying the chloroform solution over anhydrous sodium sulphate and evaporating the solvent, a crude oily base (9.7 g.) is obtained. After dissolving the latter in benzene and repeatedly extracting the solution with 15% hydrochloric acid, the acid fractions are combined and made alkaline with potassium carbonate. They are then extracted several times with chloroform and the combined chloroformic solutions are dried over anhydrous sodium sulphate. After evaporation of the solvent, the crude base obtained is purified by dissolving it in ethanol and adding ethereal hydrogen chloride. There is finally obtained 1-(2-salicyloyloxyethyl)-2-methyl-5-nitroimidazole hydrochloride, M.P. 154° C.

*Example IX*

14.7 g. of benzoyl chloride dissolved in 30 cc. of chloroform are poured into a cold solution of 17.1 g. of 1-(2-hydroxyethyl)-2-methyl-5-nitroimidazole in 200 cc. of chloroform, and 8.3 g. of pyridine are added so that the temperature remains in the neighbourhood of 5° C. The mixture is then agitated for 1 hour at room temperature, 100 cc. of water are added and the insoluble matter is filtered off. The organic layer is decanted and washed with 50 cc. of a 10% sodium bicarbonate solution and then with 100 cc. of water. The solvent is driven off on the water bath and there are obtained 21 g. of a white crystalline residue, which is recrystallised from cyclohexane. There are thus obtained 15 g. of 1-(2-benzoyloxyethyl)-2-methyl-5-nitroimidazole, which is a white crystalline powder, M.P. 100° C.

*Example X*

Into a solution of 17.1 g. of 1-(2-hydroxyethyl)-2-methyl-5-nitroimidazole and 8.3 g. of pyridine in 200 cc. of chloroform is poured a solution of 18.4 g. of o-chlorobenzoyl chloride in 70 cc. of chloroform, the temperature being maintained below 5° C. during the addition. The mixture is then agitated for 1 hour in the cold and then allowed to return to room temperature. 100 cc. of iced water are then poured in, an insoluble fraction is filtered off, and the organic layer is washed with 40 cc. of aqueous 10% sodium bicarbonate solution and then with 100 cc. of water. The solvent is driven off on a water bath under reduced pressure (30 mm. Hg), and the residue is recrystallised from cyclohexane. There are thus obtained 14.8 g. of 1-(2-o-chlorobenzoyloxyethyl)-2-methyl-5-nitroimidazole, which is a white crystalline powder, M.P. 104° C.

*Example XI*

Into a solution of 17.1 g. of 1-(2-hydroxyethyl)-2-methyl-5-nitroimidazole and 8.3 g. of pyridine in 200 cc. of chloroform is poured a solution of 22.2 g. of 3:4:5-trimethoxybenzoyl chloride in 70 cc. of chloroform, the temperature being maintained at 2–3° C. The mixture is thereafter agitated for 1 hour in the cold and then allowed to return to room temperature. 100 cc. of iced water are added and the insoluble matter is filtered off. The organic layer is washed with 40 cc. of 10% sodium bicarbonate solution and then with 100 cc. of water. The solvent is driven off on a water bath under reduced pressure (30 mm. Hg). There is obtained a pale yellow oil, which is dissolved in a mixture of 40 cc. of chloroform and 40 cc. of diethyl ether. 20 cc. of a 3.5 N solution of hydrochloric acid in diethyl ether are added. The hydrochloride precipitate is separated off and redissolved in 200 cc. of chloroform and treated with an excess of solid sodium bicarbonate. The chloroform solution is filtered and the chloroform is driven off on a water bath under reduced pressure (30 mm. Hg). The residue is recrystallised from 200 cc. of cyclohexane. There is thus obtained 1 - [2 - (3:4:5-trimethoxy-benzoyloxy)ethyl]-2-methyl-5-nitroimidazole, which is a white crystalline powder, M.P. 116° C.

Example XII

Into a solution 17.1 g. of 1-(2-hydroxyethyl)-2-methyl-5-nitroimidazole and 8.3 g. of pyridine in 200 cc. of chloroform are poured 17.9 g. of p-methoxybenzoyl chloride dissolved in 70 cc. of chloroform, the temperature remaining below 4° C. The mixture is agitated for 1 hour in the cold and thereafter allowed to return to room temperature. 100 cc. of iced water are run in, the insoluble matter is filtered off and the chloroform layer is decanted and washed with 40 cc. of 10% sodium bicarbonate solution and then with 100 cc. of water. The solvent is driven off on the water bath under reduced pressure (30 mm. Hg), and there remains a yellow oil (24 g.). The oil obtained is dissolved in 50 cc. of diethyl ether and 100 cc. of chloroform, and 50 cc. of a 3.5 N solution of hydrochloric acid in diethyl ether are added. The hydrochloride precipitate obtained is suction-filtered and washed with 50 cc. of chloroform and 50 cc. of ether. It is thereafter re-suspended in 200 cc. of chloroform and there are added 30 g. of solid sodium bicarbonate. After the reaction, the chloroform solution is filtered off, the precipitate is washed with 50 cc. of chloroform and the solvent is driven off on the water bath under reduced pressure (300 mm. Hg.). The white residue weighing 19 g. is recrystallised from a mixture of cyclohexane and benzene. There are thus obtained 16.9 g. of 1-(2-p-methoxy-benzoyloxyethyl)-2-methyl-5-nitroimidazole, which is a white crystalline powder, M.P. 102° C.

Example XIII

Into a solution of 17.1 g. of 1-(2-hydroxyethyl)-2-methyl-5-nitroimidazole and 8.3 g. of pyridine in 200 cc. of chloroform are run 20.2 g. of p-nitrobenzoyl chloride in 90 cc. of chloroform, the temperature remaining at 4° C. The mixture is agitated for 1 hour in ice and then allowed to return to room temperature. 100 cc. of iced water are added and a considerable quantity of insoluble matter (A) is filtered off. The chloroform solution is washed with 40 cc. of a 10% sodium bicarbonate solution and then with 100 cc. of water. The chloroform is driven off on a water bath and a crystalline residue (B) is obtained.

The products (A) and (B) are combined and dissolved in 150 cc. of chloroform. 0.4 g. of pyridine are added to the suspension obtained, 0.9 g. of p-nitrobenzoyl chloride are run in and the mixture is agitated for 15 hours at ambient temperature. The product is diluted with 100 cc. of chloroform and washed with 40 cc. of a 10% sodium bicarbonate solution and then with 100 cc. of water. After drying over sodium sulphate, the chloroform is driven off on the water bath under reduced pressure (30 mm. Hg). There remains a pale yellow solid (10 g.), which is recrystallised from ethyl acetate, whereby there are obtained 7 g. of 1-(2-p-nitrobenzoyloxyethyl)-2-methyl-5-nitroimidazole, M.P. 166° C.

Example XIV

Into a solution of 17.1 g. of 1-(2-hydroxyethyl)-2-methyl-5-nitroimidazole and 8.3 g. of pyridine in 250 cc. of chloroform are poured 12.6 g. of pivalyl chloride in 50 cc. of chloroform, the temperature being maintained at 3-4° C. The mixture is thereafter allowed to return to room temperature and is then refluxed for 1 hour. After cooling, 50 cc. of iced water are added, the insoluble matter is filtered off and the organic layer is decanted and washed with 40 cc. of a 10% sodium bicarbonate solution and then with 60 cc. of water. The chloroform is driven off on the water bath under reduced pressure (300 mm. Hg) and there are obtained 14 g. of a brownish-green oil. The oil is taken up in 100 cc. of ether and 30 cc. of a 3.5 N solution of hydrochloric acid in diethyl ether are added. The precipitate is filtered off and washed with 45 cc. of ether. It is then taken up in 300 cc. of chloroform and the insoluble matter is filtered off. To the solution are added 65 g. of powdered sodium bicarbonate, the insoluble matter is filtered off, the solvent is driven off on a water bath and the residue is recrystallised from petroleum spirit. There are thus obtained 7.5 g. of 1-(2-pivalyloxyethyl)-2-methyl-5-nitroimidazole, which is a white crystalline powder, M.P. 39° C.

Example XV

Into a solution of 17.1 g. of 1-(2-hydroxyethyl)-2-methyl-5-nitroimidazole and 8.3 g. of pyridine in 150 cc. of chloroform are poured 11 g. of phthalyl chloride dissolved in 50 cc. of chloroform, the temperature remaining below 3° C. during the addition. The temperature is maintained at 10-15° C. for 3 hours, 100 cc. of iced water are added, the insoluble fraction is filtered off, and the chloroform layer is washed with 15 cc. of a 10% sodium bicarbonate solution and then with 100 cc. of water. The chloroform is driven off on the water bath under reduced pressure (30 mm. Hg). There remains a brown oil which is crystallised from 100 cc. of diethyl ether. After recrystallisation from ethyl acetate, there are obtained 7 g. of the neutral phthalic ester of 1-(2-hydroxyethyl)-2-methyl-5-nitroimidazole, which is a white crystalline powder, M.P. 130° C.

Example XVI

Into a solution of 17.1 g. of 1-(2-hydroxyethyl)-2-methyl-5-nitroimidazole and 8.3 g. of pyridine in 200 cc. of chloroform are poured 8.1 g. of succinyl chloride in 30 cc. of chloroform, the temperature remaining below 5° C. The mixture is allowed to return to the ambient temperature and agitated for 1 hour. 100 cc. of iced water are added, the insoluble matter is filtered off and the chloroform layer is decanted and washed with 50 cc. of a 10% sodium bicarbonate solution and then with 60 cc. of water. The chloroform is driven off on a water bath under reduced pressure (30 mm. Hg.) and the gummy residue is recrystallised from 150 cc. of benzene. There are thus obtained 9 g. of the neutral succinic ester of 1-(2-hydroxyethyl)-2-methyl-5-nitroimidazole, which is a white crystalline powder, M.P. 128° C.

We claim:

1. A member of the class consisting of an imidazole derivative of the general formula:

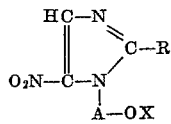

wherein R represents a member of the class consisting of a hydrogen atom and an alkyl group containing up to five carbon atoms, A represents a saturated aliphatic wholly hydrocarbon group containing two to four carbon atoms and X is a member of the class consisting of N-alkanoic acyl containing 1-17 carbon atoms in the alkane radical, dichloroacetyl, pivaloyl, cinnamoyl, succinoyl, benzoyl, chlorobenzoyl, methoxybenzoyl, nitrobenzoyl, salicyloyl, phthaloyl, acid addition salts of the above members having pharmaceutically acceptable anions and hydrogen.

2. The compound 1-(2-hydroxyethyl)-2-methyl-5-nitroimidazole.

3. The compound 1-(2-benzoyloxyethyl)-2-methyl-5-nitroimidazole.

4. The compound 1-(2-succinoyloxyethyl)-2-methyl-5-nitroimidazole.

5. The compound 1-(2-hydroxyethyl)-2-ethyl-5-nitroimidazole.

6. The compound 1-(2-cinnamoyloxyethyl)-2-methyl-5-nitroimidazole.

7. The compound 1-(2-dichloroacetoxyethyl)-2-methyl-5-nitroimidazole.

8. Process for the preparation of an imidazole compound of the general formula:

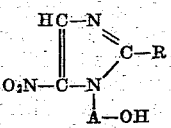

wherein R represents a member of the class consisting of a hydrogen atom and an alkyl group containing up to five carbon atoms, and A represents a saturated aliphatic wholly hydrocarbon group containing two to four carbon atoms which comprises reacting in the absence of a basic condensing agent a 4(or 5)-nitroimidazole with a compound of the general formula Z—A—OY wherein Z is selected from the class consisting of Cl⁻ and

and Y is selected from the class consisting of a hydrogen atom and benzyl and, where Y is benzyl, liberating the hydroxyl group by acid hydrolysis.

No references cited.